UNITED STATES PATENT OFFICE.

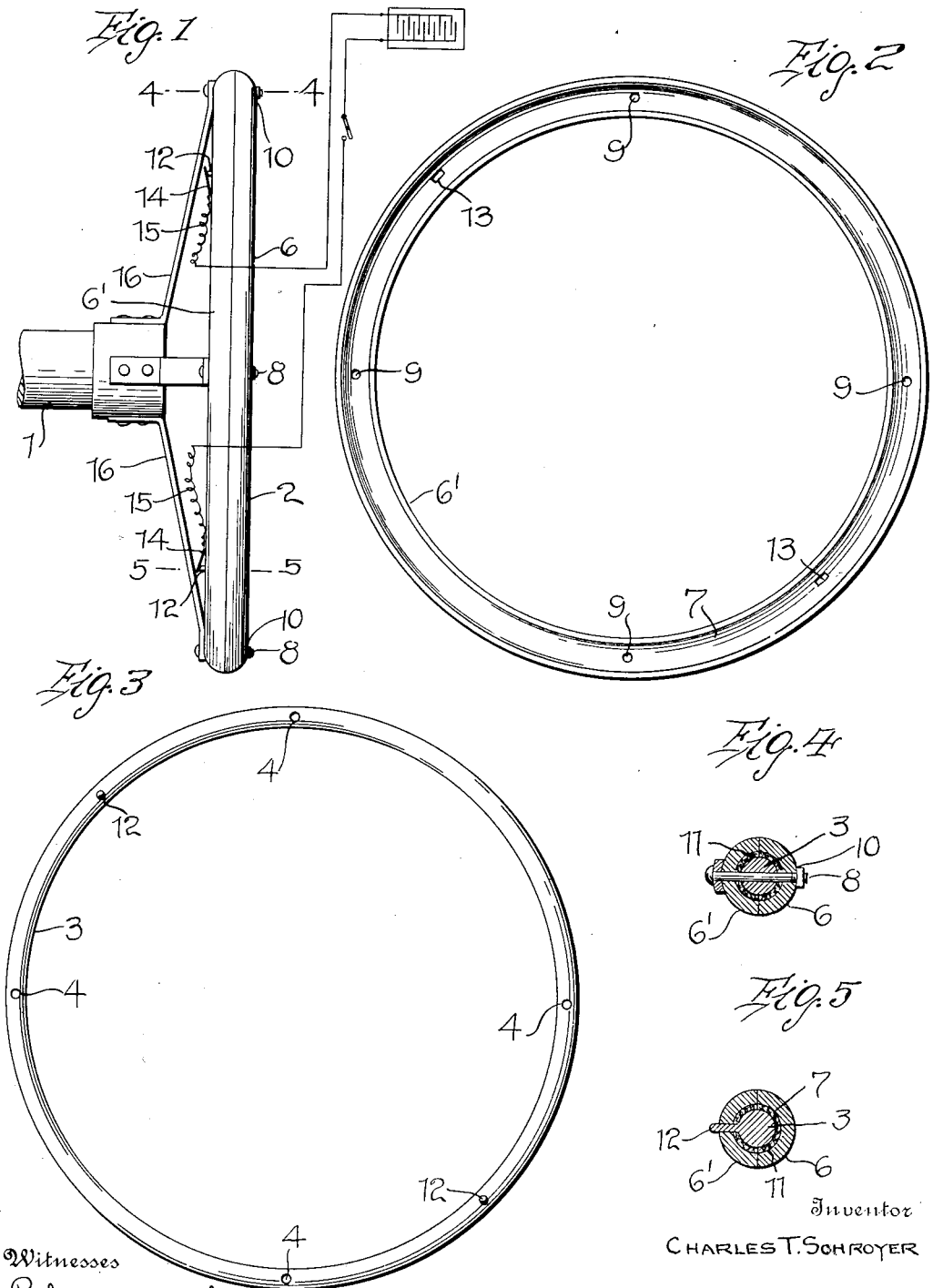

CHARLES T. SCHROYER, OF CHESTER, SOUTH DAKOTA.

STEERING-WHEEL.

1,088,796.  Specification of Letters Patent.  Patented Mar. 3, 1914.

Application filed February 15, 1913. Serial No. 748,674.

*To all whom it may concern:*

Be it known that I, CHARLES T. SCHROYER, citizen of the United States, residing at Chester, in the county of Lake and State of South Dakota, have invented certain new and useful Improvements in Steering-Wheels, of which the following is a specification, reference being had to the accompanying drawings.

This invention relates to new and useful improvements in steering wheels for motor vehicles, aeroplanes and the like, the object of the invention being to provide a steering wheel which is so constructed that it may be readily heated by an electric supply from a storage battery or other suitable source so that the wheel will provide a warmer for the fingers and hands during the cold weather.

Another object of the invention is to provide a steering wheel of the above character which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claim and shown in the accompanying drawings, in which—

Figure 1 is a side elevation of a steering wheel constructed in accordance with my invention; Fig. 2 is an elevation of one of the sections of the wheel showing the interior thereof; Fig. 3 is an elevation of the central core; Fig. 4 is a sectional view taken on line 4—4 of Fig. 1; Fig. 5 is a sectional view taken on line 5—5 of Fig. 1.

Referring more particularly to the drawings, 1 indicates the steering post upon the upper end of which is mounted my improved steering wheel 2, said wheel comprising a core which is in the form of a copper ring 3, having suitable bolt receiving openings 4 formed therein. The ring 3 is inclosed by means of a suitable casing 5 which comprises the two semicircular sections 6 and 6' having annular grooves 7 formed therein adapted to receive opposite sides of the ring. The sections 6 and 6' are securely bolted to the ring 3 by means of the bolts 8, said bolts passing through suitable openings 9 in the casing and through the openings 4 in the ring. Nuts 10 are threaded upon the lower ends of the bolts whereby the casing is securely fastened to the ring.

A suitable lining of asbestos, as shown at 11, is arranged within the grooves 7 to prevent any destruction of the casing and to retain the heat, which radiates from the ring 3, within the casing.

Suitable contact points 12 are formed integral with the ring 3 and project through suitable openings 13 in the casing and are connected by means of the spring contacts 14, which are secured to the ends of the wires 15, to any suitable source of supply. Thus it will be seen that when the contacts 14 are engaged with the contacts 12, the circuit will be closed, thus heating the copper ring 3, which in due time will heat the casing 5 providing a warmer for the hands in cold weather.

It will be understood that my improved wheel will replace the well known form of steering wheel used at the present time.

In mounting my improved wheel upon the steering post 1, the spokes 16 are secured at their outer ends by means of the bolts 8 to the wheel rim, the inner ends of said spokes being bolted or otherwise secured to the upper end of the steering post, thus forming a strong and durable steering wheel.

From the above description taken in connection with the accompanying drawings, it will be readily apparent that I have provided a simple and durable steering wheel for motor vehicles, aeroplanes and the like which can be readily heated during the cold weather so as to provide a suitable warmer for the hands. It will also be apparent that the device is extremely simple in its construction and can be manufactured at a comparatively low cost.

While I have shown and described the spring contacts 14 as the preferred form of connecting the contacts 12 with the source of supply, it will be understood that any well known connection may be used between the ring 3 and the source of supply.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

The combination with a steering post having radially projecting spokes secured to the upper end thereof, of a steering wheel mounted upon the outer end of said spokes and including a sectional casing having bolt receiving openings therein, each section of said casing being provided with an annular groove, an asbestos lining arranged within said grooves, a ring arranged within said grooves, said ring being formed of a conductive material and having bolt receiving openings therein, bolts adapted to be disposed within the openings in the casing and ring to securely fasten the casing to the ring, contacts formed integral with the ring and projecting through said casing, and means whereby an electric current may be supplied to the ring for electrically heating the casing.

In testimony whereof I hereunto affix my signature in the presence of two witnesses.

CHARLES T. SCHROYER.

Witnesses:
C. H. OWENS,
ROY J. MCLEOD.

Copies of this patent may be obtained for five cents each, by addressing the "Commissioner of Patents, Washington, D. C."